UNITED STATES PATENT OFFICE.

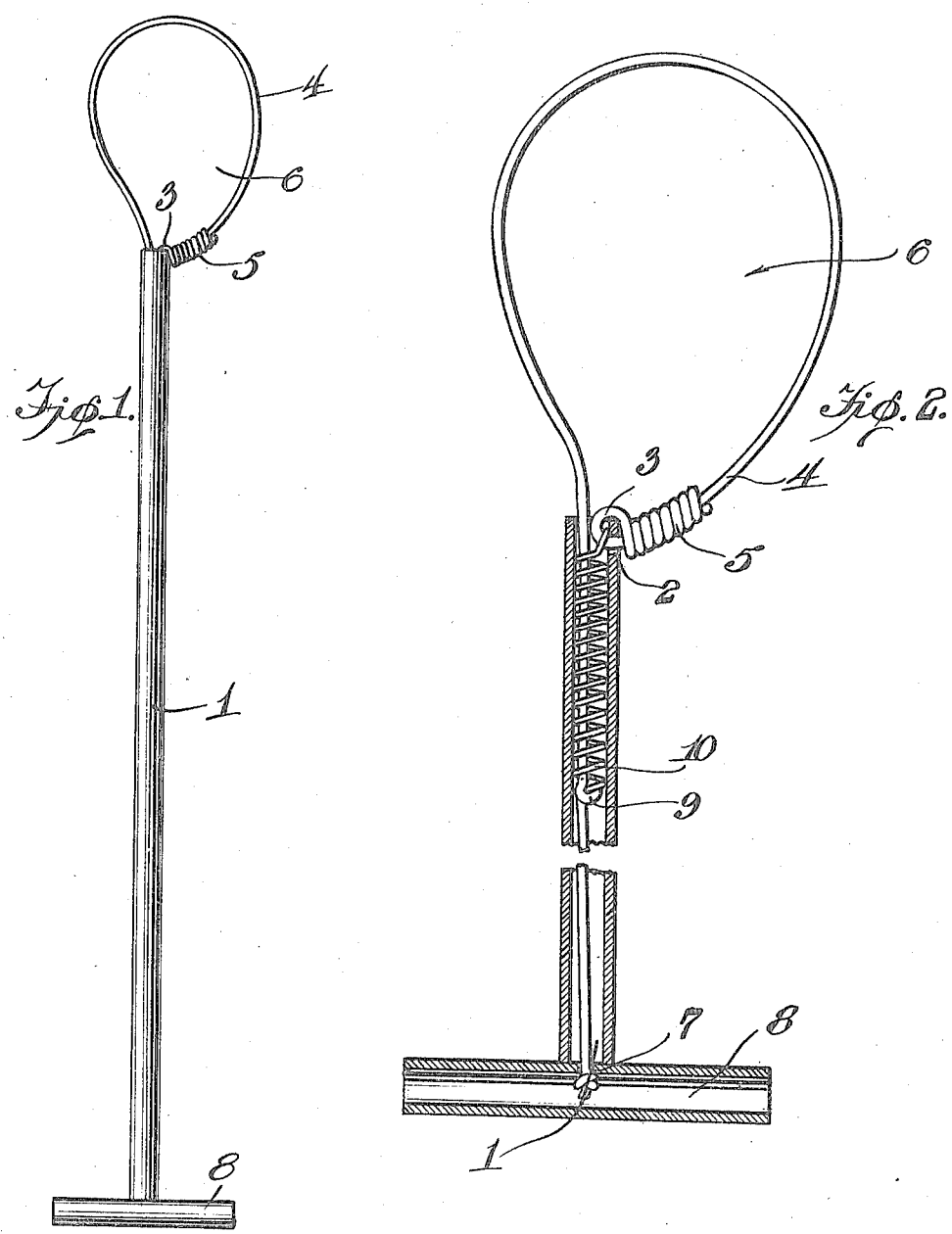

ALBERT M. PERRIN, OF WILMINGTON, OHIO.

ANIMAL-SNARE.

1,257,634.

Specification of Letters Patent.

Patented Feb. 26, 1918.

Application filed April 2, 1917. Serial No. 159,227.

*To all whom it may concern:*

Be it known that I, ALBERT M. PERRIN, a citizen of the United States, residing at Wilmington, in the county of Clinton and State of Ohio, have invented certain new and useful Improvements in Animal-Snares, of which the following is a specification.

This invention relates to animal snares and more particularly to an animal catcher and holding device especially adapted for catching and holding hogs by the snout or leg.

One of the objects of the invention is to provide a wire noose designed to expand and contract to grasp or release the leg or snout of an animal in a manner that will cause a tight grip to be maintained as long as the animal pulls against the hold maintained by the user of the device.

Another object of the invention is the provision of a catching and holding noose associated with resilient means operating to hold the noose in expanded position, whereby the noose may be immediately released from engaged position by relaxing the hold on the handle of the device.

A further object of this invention is the provision of an animal snare which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation of the device constructed in accordance with my invention.

Fig. 2 is an enlarged longitudinal section partly broken away.

Referring to the drawings, wherein is illustrated the preferred form of my invention, and in which like numerals of reference indicate corresponding parts throughout the several views, a relatively long extension rod 1 is formed of a suitable length of tubular material and has both ends open. At one end the tube is provided with an opening 2 for receiving a loop 3 formed at the end of a flexible wire 4. The end of the wire is coiled a number of times around the adjacent portion of the loop as indicated at 5 to provide a firm grip on the end of the pipe or extension rod 1. The opposite end of the flexible wire is passed longitudinally through the interior of the extension rod 1, thereby forming a noose 6. The free end of the wire is extended through the opposite end of the extension rod 1 and through the opening 7 formed in the tubular handle 8. Within the tubular handle, the end of the wire is knotted to prevent the wire from being drawn through the opening 7.

At any desirable point on the wire within the extension rod 1, a loop 9 is formed which is permanently shaped and receives one end of a coil tension spring 10. The coils of this spring embrace the corresponding portion of the wire within the tubular extension rod and the opposite end of the spring is fixed to the loop 3. Since, the tension spring will pull the end of the wire it is obvious that the handle 8 will be held in tight engagement, under normal conditions, with the end of the rod 1 as shown in both figures of the drawing.

In use, the operator, will grasp the rod 1 with one hand and the handle 8 with the other hand, and place the noose 6 over either the snout or leg of the animal. By pulling the handle outwardly against the tension of the spring the noose 6 will be contracted to tightly embrace the animal. The animal will then immediately attempt to withdraw and pull away from the device, while the operator will maintain the firm hold on the handle 8. The harder the animal pulls, the tighter the noose will contact around the engaged part of the animal and the operator may thus hold the animal until he desires to release it. The releasing operation is accomplished by merely relaxing the hold on the handle 8, whereupon the spring 10 will pull the wire to permit the noose to expand.

From the foregoing it will be observed that a very simple and durable animal snare has been provided, the details of which embody the preferred form. I desire it to be understood, however, that slight changes in the minor details of construction may be made without departing from the spirit of the invention or the scope of the claims hereunto appended.

I claim:

1. A device of the character described comprising a tubular extension rod having both ends open, a flexible wire having one end secured to one end of the said tubular rod and shaped to form a noose from which the said wire is extended longitudinally through the said tubular rod and projected beyond the opposite end thereof, a tubular handle attached to the said extended end of the wire, a coil tension spring mounted within the tubular rod and having one end connected to the fixed end of the said flexible wire and the opposite end joined to the said wire at a point in spaced relation from the open end of the said tube and normally urging the said wire through the tube to maintain the said noose in expanded position.

2. A device of the character described comprising a tubular extension rod having both ends open, a flexible wire having one end secured to one end of the said tubular rod and shaped to form a noose from which the said wire is extended longitudinally through the said tubular rod and projected beyond the opposite end thereof, a tubular handle attached to the said extended end of the wire, a coil tension spring mounted within the tubular rod and having one end connected to the fixed end of the said flexible wire and the opposite end joined to the said wire at a point in spaced relation from the open end of the said tube and normally urging the said wire through the tube to maintain the said noose in expanded position, the said wire having a loop formed within the said tubular member, the inner end of the said coil spring being fixed to the said loop.

In testimony whereof I affix my signature in presence of two witnesses.

ALBERT M. PERRIN.

Witnesses:
J. W. MOBBERLY,
C. E. HAYDOCK.

Copies of this patent may be obtained for five cents each, by addressing the "Commissioner of Patents, Washington, D. C."